United States Patent
Nakano et al.

(10) Patent No.: US 11,807,096 B2
(45) Date of Patent: Nov. 7, 2023

(54) DISPLAY DEVICE FOR VEHICLE

(71) Applicant: YAZAKI CORPORATION, Tokyo (JP)

(72) Inventors: Junya Nakano, Shizuoka (JP); Kazuhiro Matsunaga, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 741 days.

(21) Appl. No.: 15/135,612

(22) Filed: Apr. 22, 2016

(65) Prior Publication Data

US 2016/0314752 A1 Oct. 27, 2016

(30) Foreign Application Priority Data

Apr. 22, 2015 (JP) ................................. 2015-087333

(51) Int. Cl.
*B60K 35/00* (2006.01)
*G09G 3/36* (2006.01)
*G09G 5/14* (2006.01)

(52) U.S. Cl.
CPC ............ *B60K 35/00* (2013.01); *G09G 3/3611* (2013.01); *B60K 2370/113* (2019.05);
(Continued)

(58) Field of Classification Search
CPC .............................. G09G 5/14; G09G 2340/10
(Continued)

(56) References Cited

U.S. PATENT DOCUMENTS

2006/0022975 A1* 2/2006 Bredow ................. G06T 13/60
  345/422
2007/0229540 A1  10/2007 Nakahara et al.
(Continued)

FOREIGN PATENT DOCUMENTS

JP          9-292601 A    11/1997
JP       2007-261472 A    10/2007
(Continued)

OTHER PUBLICATIONS

Japanese Office Action for the related Japanese Patent Application No. 2015-087333 dated May 9, 2017.
(Continued)

*Primary Examiner* — Jin Ge
(74) *Attorney, Agent, or Firm* — KENEALY VAIDYA LLP

(57) ABSTRACT

A display device for a vehicle includes: a first image control section that displays a first entire image in a certain entire display region; a second image control section that displays a second entire image that is changed from the first entire image in the certain entire display region; and an intermediate image control section that displays a single intermediate entire image indicating an intermediate stage of a change between the first entire image and the second entire image in the certain entire display region. The second image control section displays a final display state in which a certain mark is displayed in a certain portion within the certain display region as the second entire image. The intermediate image control section displays the intermediate entire image having an afterimage of the certain mark being extended in a track direction on a track of the certain mark moving to the certain portion.

8 Claims, 16 Drawing Sheets

(52) U.S. Cl.
CPC ... *B60K 2370/115* (2019.05); *B60K 2370/139* (2019.05); *B60K 2370/165* (2019.05); *G09G 5/14* (2013.01); *G09G 2320/0261* (2013.01); *G09G 2340/02* (2013.01); *G09G 2360/04* (2013.01); *G09G 2380/10* (2013.01)

(58) Field of Classification Search
USPC .......................................................... 345/629
See application file for complete search history.

(56) References Cited

U.S. PATENT DOCUMENTS

| | | | |
|---|---|---|---|
| 2007/0296724 A1 | 12/2007 | Katoh et al. | |
| 2008/0211652 A1* | 9/2008 | Cope ...................... | B60K 35/00 340/461 |
| 2008/0215978 A1 | 9/2008 | Bamba | |
| 2008/0309475 A1* | 12/2008 | Kuno ...................... | B60K 35/00 340/462 |
| 2009/0207175 A1* | 8/2009 | Warner ................... | G06T 13/00 345/473 |
| 2011/0080278 A1* | 4/2011 | Crombez ................ | B60K 6/445 340/438 |
| 2011/0090074 A1* | 4/2011 | Kuno ...................... | B60K 35/00 340/438 |
| 2011/0209092 A1* | 8/2011 | Tarte ...................... | B60K 35/00 715/830 |
| 2012/0017147 A1* | 1/2012 | Mark ...................... | H04N 9/3173 715/702 |
| 2012/0209538 A1* | 8/2012 | Caicedo ................ | G01N 29/043 702/39 |
| 2013/0007663 A1* | 1/2013 | Piippo .................. | G06F 3/04855 715/821 |
| 2013/0057400 A1* | 3/2013 | Dehmann .............. | B60K 37/06 340/441 |
| 2013/0067407 A1 | 3/2013 | Dehmann | |
| 2013/0100164 A1 | 4/2013 | Dishi | |
| 2013/0182014 A1* | 7/2013 | Park ........................ | G09G 5/00 345/649 |
| 2015/0113371 A1* | 4/2015 | Flider .................... | G06T 13/80 715/204 |

FOREIGN PATENT DOCUMENTS

| | | |
|---|---|---|
| JP | 2007-263826 A | 10/2007 |
| JP | 2007-264176 A | 10/2007 |
| JP | 2008-8637 A | 1/2008 |
| JP | 2008-217338 A | 9/2008 |
| JP | 2008-254539 A | 10/2008 |
| JP | 2009-101798 A | 5/2009 |
| JP | 2009-101861 A | 5/2009 |
| JP | 2012-1029 A | 1/2012 |
| JP | 2012-2629 A | 1/2012 |
| JP | 2013-132972 A | 7/2013 |
| JP | 2015-63302 A | 4/2015 |
| WO | 2011/158545 A1 | 12/2011 |

OTHER PUBLICATIONS

Japanese Office Action for the related Japanese Patent Application No. 2015-087333 dated Dec. 5, 2017.

Japanese Office Action for the related Japanese Patent Application No. 2015-087333 dated May 15, 2018.

Japanese Office Action for the related Japanese Patent Application No. 2018-135668 dated May 21, 2019.

* cited by examiner

DISPLAY DEVICE FOR VEHICLE

CROSS REFERENCE TO RELATED APPLICATION

This application is based on Japanese Patent Application (No. 2015-087333) filed on Apr. 22, 2015, the contents of which are incorporated herein by reference. Also, all the references cited herein are incorporated as a whole.

BACKGROUND OF THE INVENTION

1. Technical Field

The present invention relates to a display device for a vehicle that is mounted in a vehicle and supplies information to a vehicle crew by an image displayed on a liquid crystal display.

2. Background Art

In the related art, a display device for a vehicle displaying various kinds of information on a liquid crystal display has been proposed (see Patent Documents 1 and 2). In such a display device for a vehicle, during a change from one image to another image, a plurality of images that are intermediate display contents of those images are interposed therebetween and the change between the images is smoothly expressed (see Patent Document 3). In addition, there is a display device for a vehicle that smoothly expresses the change between the images by performing a reproducing process of a video file during the change from one image to another image.

[Patent Document 1] JP-A-2012-2629
[Patent Document 2] JP-A-9-292601
[Patent Document 3] JP-A-2013-132972

SUMMARY OF THE INVENTION

However, in the display device for a vehicle described above, in a case where the plurality of images are interposed during the change from one image to another image, it is necessary to store data of the plurality of images and there is a problem that storage capacity of the device increases. In addition, even in a case where the video file is reproduced, it is necessary to store data of an original video file having a large capacity and there is a problem that the storage capacity of the device increases.

The invention is made to solve the problem described above and an object of the invention is to provide a display device for a vehicle in which a change between images is smoothly expressed and a storage capacity used for smooth expression is reduced.

A display device for a vehicle according to the invention, which performs information display by a liquid crystal display, includes a first image control section that displays a first entire image in a certain entire display region of the liquid crystal display; a second image control section that displays a second entire image that is changed from the first entire image displayed by the first image control section in the certain entire display region; and an intermediate image control section that displays a single intermediate entire image indicating an intermediate stage of a change between the first entire image by the first image control section and the second entire image by the second image control section in the certain entire display region. The second image control section displays a final display state in which a certain mark is displayed in a certain portion within the certain display region as the second entire image. The intermediate image control section displays the intermediate entire image having an afterimage of the certain mark extending in a track direction on a track that is extended when the certain mark moves to the certain portion.

In addition, in the display device for a vehicle according to the invention, the afterimage may be a gradation image of which gradation is changed in an extended direction.

In addition, in the display device for a vehicle according to the invention, the second image control section may display the second entire image changed from the first entire image when instruction contents from a vehicle crew are input thereto.

In addition, in the display device for a vehicle according to the invention, the first image control section and the second image control section may display a plurality of state marks corresponding to a plurality of states of the vehicle in each entire image as a plurality of the certain marks, and the second image control section may display the second entire image in which an arrangement of the plurality of state marks is changed from the first entire image.

In addition, in the display device for a vehicle according to the invention, the first image control section and the second image control section may display a still image of which a position is not changed in the first entire image and the second entire image, and the intermediate image control section may display the afterimage overlapping the still image.

In addition, in the display device for a vehicle according to the invention, the first image control section and the second image control section may display a track image extending in the track direction as the still image.

In addition, in the display device for a vehicle according to the invention, the first image control section and the second image control section may display the plurality of state marks corresponding to the plurality of states of the vehicle in each entire image as the plurality of the certain marks, and the second image control section may display the second entire image in which the arrangement of the plurality of state marks is changed from the first entire image, and the first image control section and the second image control section may display the still image at a center of rotation in a case where the track direction is a rotating direction.

According to the display device for a vehicle of the invention, the change between images is smoothly expressed and it is possible to reduce a storage capacity used for smooth expression.

BRIEF DESCRIPTION OF THE DRAWINGS

FIG. 5A illustrates a first entire image, and FIG. 5B illustrates a second entire image.

FIG. 11A illustrates a first entire image, FIG. 11B illustrates a second entire image, and FIG. 11C illustrates an intermediate entire image.

FIG. 12A illustrates a first entire image, FIG. 12B illustrates a second entire image, and FIG. 12C illustrates an intermediate entire image.

FIG. 14A illustrates a second entire image, and FIG. 14B illustrates an intermediate entire image.

FIG. 15A illustrates a first entire image, FIG. 15B illustrates a second entire image, and 15C illustrates an intermediate entire image.

FIG. 16A illustrates a first entire image, FIG. 16B illustrates a second entire image, and FIG. 16C illustrates an intermediate entire image.

DETAILED DESCRIPTION OF THE EXEMPLARY EMBODIMENTS

Hereinafter, the invention will be described along with one preferred embodiment, but the invention is not limited to the following embodiment. The invention may be modified without departing from the scope of the invention and a technique of each embodiment may be combined within a possible range.

Figure 1:
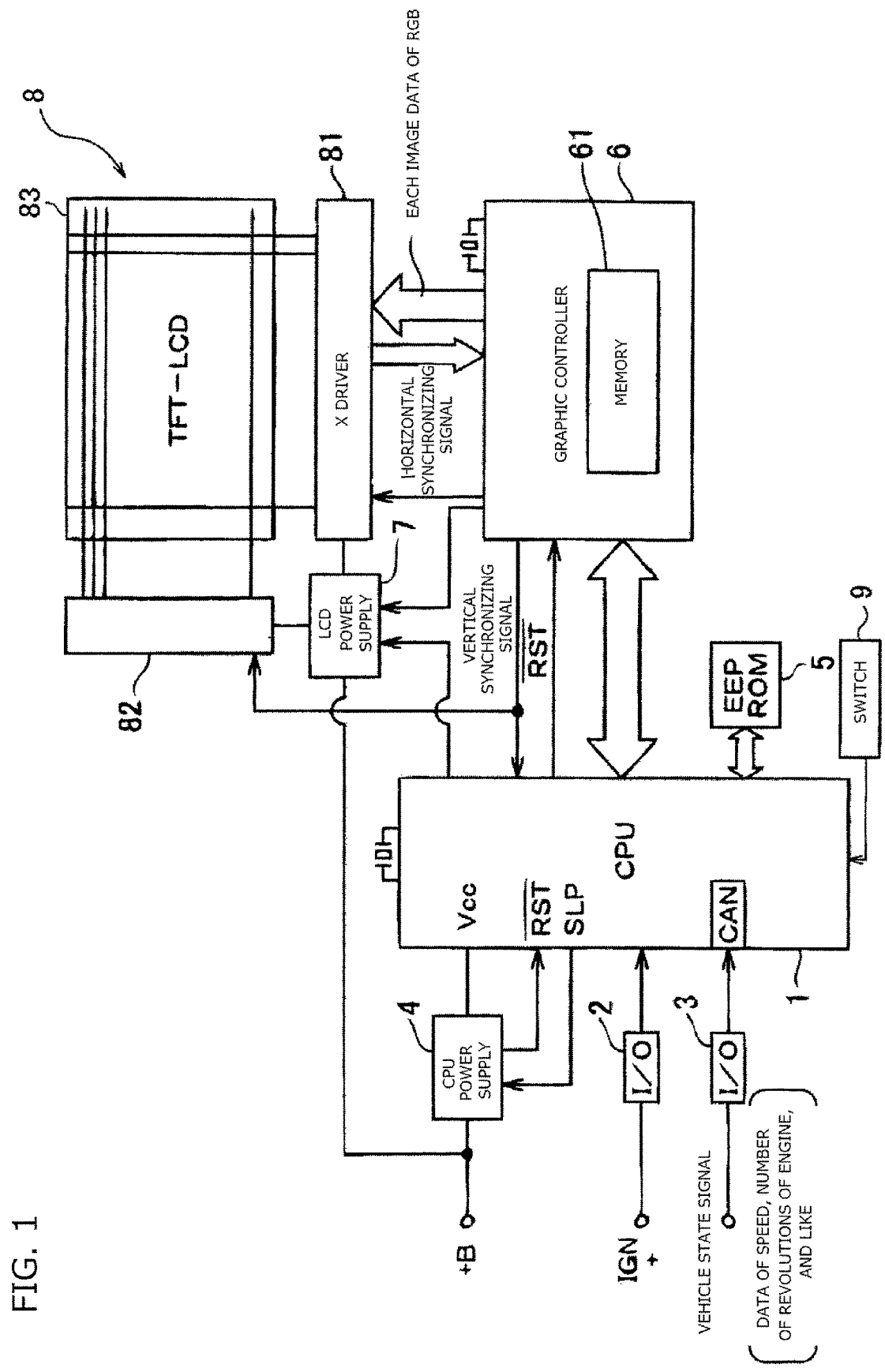
FIG. 1 is a block diagram illustrating a display device for a vehicle according to a first embodiment of the invention.

FIG. 1 is a block diagram illustrating a display device for a vehicle according to a first embodiment of the invention. The display device for a vehicle illustrated in FIG. 1 is a so-called graphic meter that is mounted in a vehicle and includes a thin film transistor liquid crystal display (TFT-LCD: an example of a liquid crystal display) as a display 8. Various kinds of information are supplied to a vehicle crew by the image displayed on the display 8.

Figure 2:
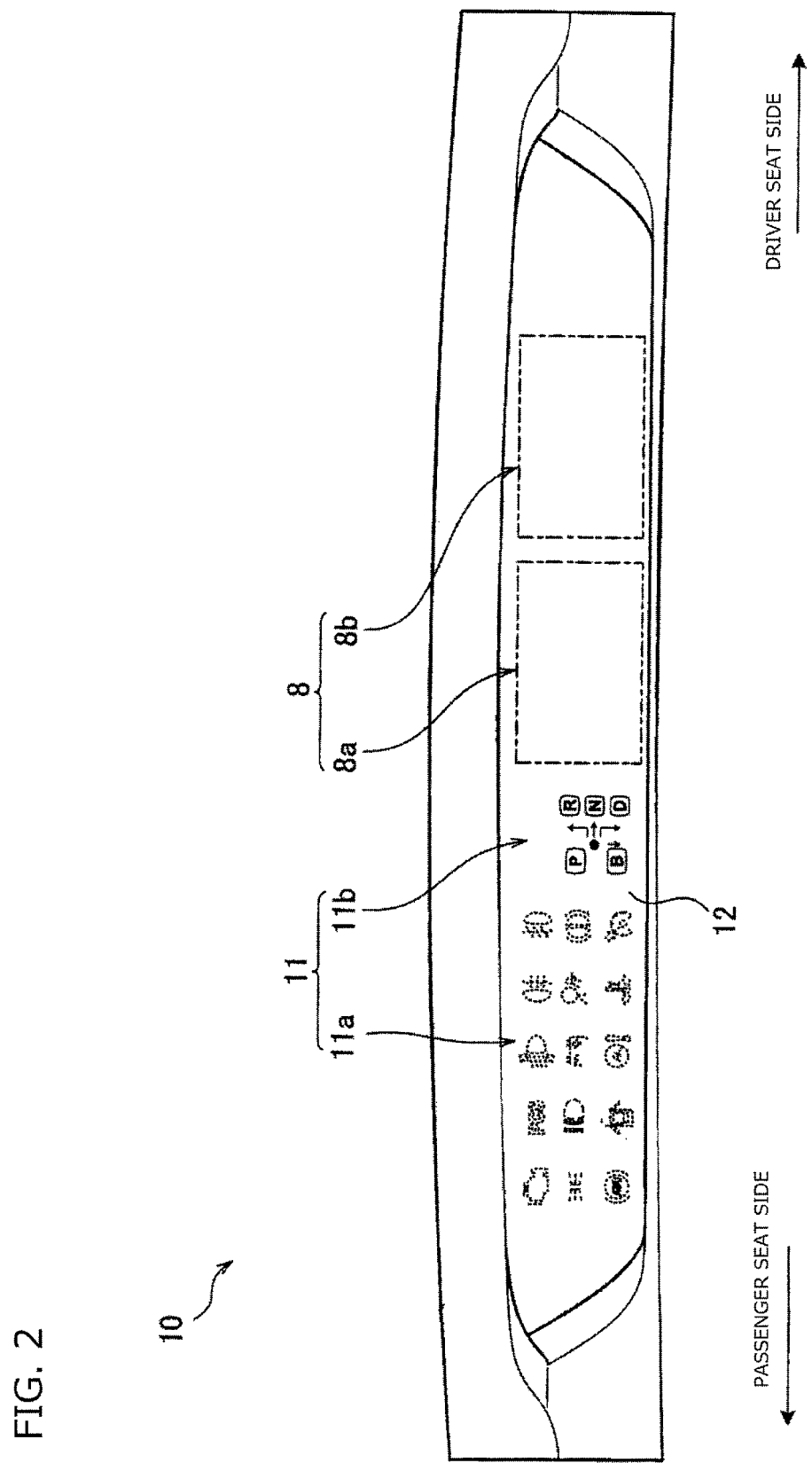
FIG. 2 is a front view illustrating an instrument for a vehicle including a display illustrated in FIG. 1.

The display 8 is a display unit on which a color image can be displayed. FIG. 2 is a front view illustrating an instrument for a vehicle including the display 8 illustrated in FIG. 1. An instrument 10 for a vehicle illustrated in FIG. 2 is disposed in an instrument panel provided on a dashboard of the vehicle and displays various alarms, a running speed, various modes of the vehicle, and the like.

In the example illustrated in FIG. 2, the instrument for a vehicle includes two displays 8a and 8b on a driver seat side. On the other hand, the instrument 10 for a vehicle includes a warning display section 11a and a shift position indicator 11b on a passenger seat side of the display 8. The display section 11a and the indicator 11b are not configured of a liquid crystal display, but are configured of a so-called dial 12 and a lamp (not illustrated) provided on a rear surface of the dial 12, and display warning contents or a shift position by lighting of the lamp.

Again, FIG. 1 is referred to. The display device for a vehicle including the display 8 described above includes a central processing unit (CPU: a first image control section, a second image control section, and an intermediate image control section) 1, I/O 2 and 3, a CPU power supply 4, an electrically erasable programmable read only memory (EE-PROM) 5, a graphic controller 6, a liquid crystal display (LCD) power supply 7, and a switch 9 in addition to the display 8.

The CPU 1 inputs a signal (IGN+) indicating a state of an ignition switch on a vehicle side via the I/O 2 and receives a vehicle state signal in a CAN communication section using a controller area network (CAN) as a communication protocol via the I/O 3. Moreover, the vehicle state signal is, for example, a signal including information indicating vehicle physical quantities such as a vehicle speed and a supercharge pressure value.

In addition, the CPU 1 has a function of receiving a command code with respect to the graphic controller 6. The graphic controller 6 performs a drawing process according to the command code.

The CPU power supply 4 generates a DC voltage (Vcc) necessary for an operation of the CPU 1 by inputting DC power supplied from a positive power supply line (+B) of the vehicle side. In addition, the CPU power supply 4 generates a reset signal if necessary or performs an operation for suppressing a supply of power in accordance with a sleep signal output from the CPU 1. The EEPROM 5 holds contents of programs that are executed by the CPU 1, fixed data that is prepared in advance, image data that is necessary for drawing, and the like.

The graphic controller 6 performs the drawing process in accordance with the command code from the CPU 1 and includes a memory 61. The memory 61 stores data necessary for drawing and stores image data necessary for displaying a speed meter, traveling modes (for example, a normal mode, an eco mode, and a power mode), and the like. The image data is read from the EEPROM 5, for example, when turning on an ignition switch and is stored in the memory 61.

Such graphic controller 6 controls a X driver 81 and a Y driver 82 of the display 8 by outputting each image data of RGB in the drawing process and outputting a horizontal synchronizing signal and a vertical synchronizing signal to the X driver 81 and the Y driver 82 of the display 8, and displays images such as the speed meter and the traveling modes on a body section 83 of the display 8.

The LCD power supply 7 inputs DC power supplied from the positive power supply line (+B) of the vehicle side, generates certain DC power necessary for displaying of the display 8, and supplies DC power to the display 8.

The switch 9 is an operation section receiving an operation performed by the vehicle crew and, for example, is configured of a single pressing switch. In the embodiment, the traveling modes are changed each time the switch 9 is pressed. Moreover, the switch 9 is not limited to the single pressing switch and may be a rotary switch or a cross key switch, and may be a sound recognition section as long as instruction contents from the vehicle crew can be input.

Here, the display device for a vehicle according to the embodiment performs the following characteristic image display if the traveling modes of the vehicle are changed. Hereinafter, this point will be described.

Figure 3:
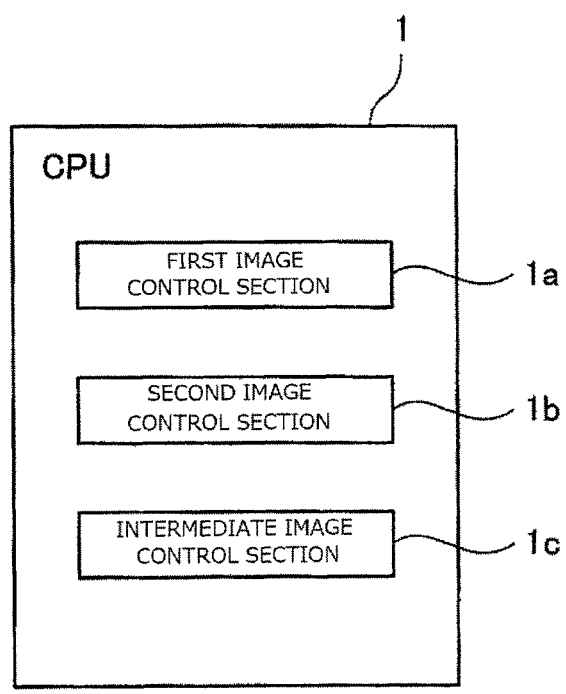
FIG. 3 is a functional block diagram of a CPU according to the embodiment.

FIG. 3 is a functional block diagram of the CPU 1 according to the embodiment. As illustrated in FIG. 3, the CPU 1 includes a first image control section (first image controller) 1a and a second image control section (second image controller) 1b.

The first image control section 1a displays a first entire image on a certain entire display region of the display 8. In addition, the second image control section 1b displays a second entire image changed from the first entire image displayed by the first image control section 1a on a certain entire display region.

Here, in the embodiment, the first entire image and the second entire image are displayed on one of the displays 8a and 8b of the display 8 illustrated in FIG. 2, but may be displayed on both. Hereinafter, if one of the displays 8a and 8b is not specified, it is simply referred to as the display 8.

Figure 4:
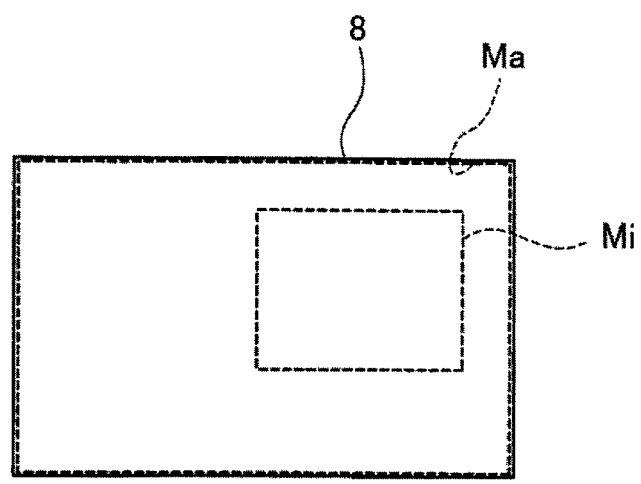
FIG. 4 is a front view illustrating a certain display region.

In addition, the certain display region of the display 8 refers to the following. FIG. 4 is a front view illustrating the certain display region. As illustrated in FIG. 4, the certain display region may be an entire screen Ma of the display 8 or may be a part Mi of the screen of the display 8. Thus, the first entire image and the second entire image may be displayed on the entire screen Ma or may be displayed on the part Mi of the screen.

Furthermore, in the embodiment, in order to illustrate an example of a case where the traveling mode is changed, the first entire image described above is an image indicating a traveling mode before the change and the second entire image is an image indicating a traveling mode after the change. Moreover, the second entire image indicates a final display state rather than an image of an intermediate stage of the change.

Figure 5A:
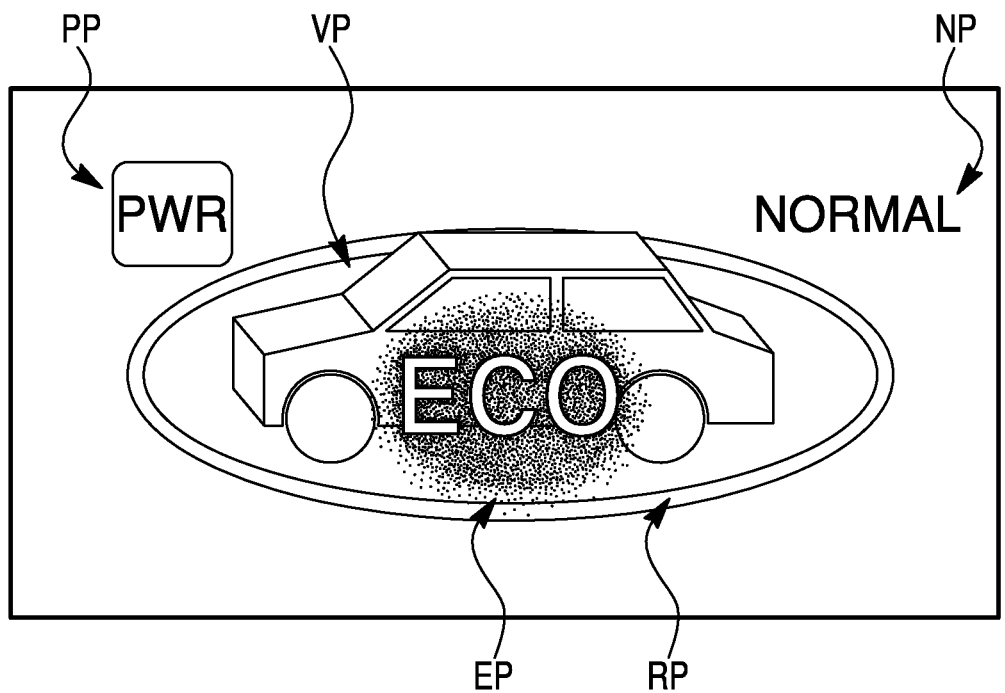
FIGS. 5A and 5B are front views illustrating images of traveling modes.
Figure 5B:
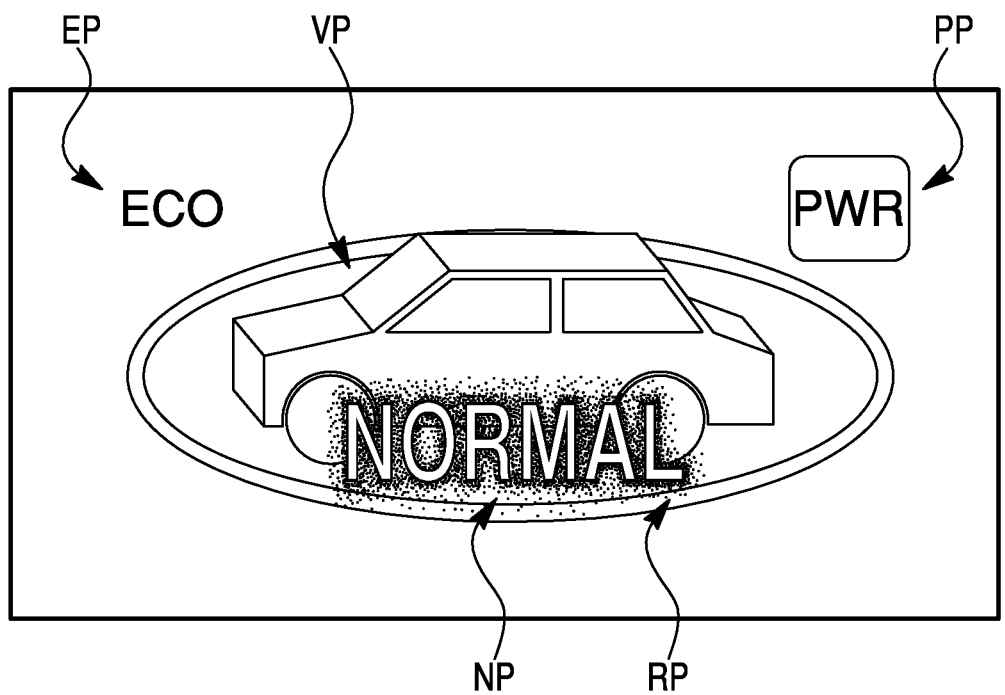

FIGS. 5A and 5B are front views illustrating the images of the traveling modes, FIG. 5A illustrates the first entire image, and FIG. 5B illustrates the second entire image. As illustrated in FIGS. 5A and 5B, the first and second image control sections 1a and 1b display a plurality of mode images (state mark and certain marks) NP, PP, and EP within the first and second entire images in accordance with a plurality of states (traveling modes) of the vehicle.

Here, if a current traveling mode is the eco mode, as illustrated in FIG. 5A, the first image control section 1a displays the first entire image, in which an eco mode display image EP is largely disposed in the center of the screen, so that the traveling mode is indicated as the eco mode. Moreover, in the first entire image, a normal mode display image NP indicating another traveling mode is, for example, disposed in an upper right corner of the screen and a power mode display image PP is, for example, disposed in an upper left corner of the screen.

Then, if the switch 9 is pressed once by the vehicle crew from such display state, the traveling mode is changed from the eco mode to the normal mode and the second image control section 1b displays the second entire image illustrated in FIG. 5B.

That is, as illustrated in FIG. 5B, the second image control section 1b displays the second entire image as the final display state in which the normal mode display image NP is largely disposed in the center of the screen (certain portion) of the display 8 so that the current traveling mode is indicated as the normal mode. Moreover, in the second entire image, the power mode display image PP that is another traveling mode is disposed, for example, in the upper right corner of the screen and the eco mode display image EP is disposed, for example, in the upper left corner of the screen.

As described above, the second image control section 1b displays the second entire image in which the arrangement of the plurality of the mode images NP, PP, and EP is changed from the first entire image as the final display state.

Here, as illustrated in FIG. 3, the CPU 1 according to the embodiment further includes an intermediate image control section (intermediate image controller) 1c. The intermediate image control section 1c displays only one (a single) intermediate entire image indicating intermediate stage of the change on a certain entire display region between the first entire image and the second entire image.

Figure 6:
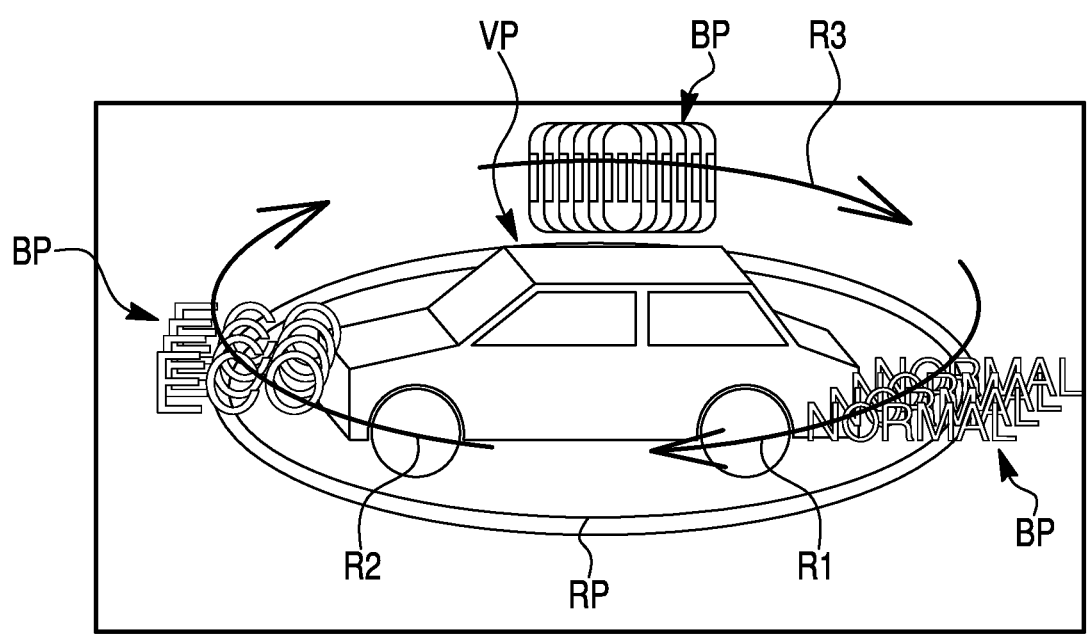
FIG. 6 is a front view illustrating an intermediate entire image interposed between the first entire image illustrated in FIG. 5A and the second entire image illustrated in FIG. 5B.

FIG. 6 is a front view illustrating the intermediate entire image interposed between the first entire image illustrated in FIG. 5A and the second entire image illustrated in FIG. 5B. The intermediate image control section 1c displays the intermediate entire image, in which the blur image (afterimage) BP is disposed, on a specific track.

Here, the specific track is a track R1 that is extended when the normal mode display image (certain mark) NP moves to the center of the screen (certain portion). More specifically, the first image control section 1a displays the first entire image in which the normal mode display image NP is disposed in the upper right corner of the screen. Then, the second image control section 1b displays the second entire image in which the normal mode display image NP is disposed in the center of the screen (certain portion) of the display 8. As described above, in the first entire image and the second entire image, the normal mode display image NP moves from the upper right corner of the screen to the center of the screen. The specific track is a track of such movement and the normal mode display image NP indicates the track R1 from the upper right corner of the screen to the center of the screen.

Moreover, as described below, since the normal mode display image NP is expressed so as to move while drawing an arc from the upper right corner of the screen toward the center of the screen, the specific track R1 rotates from the upper right corner of the screen to the center of the screen.

In addition, the blur image BP is an image in which the normal mode display image NP (certain mark) is extended in the track direction (direction of the track R1). As illustrated in FIG. 6, the blur image BP is an image having the afterimage by being extended in the track direction. That is, the blur image BP expresses the afterimage that can be perceived by a person when the person views a fast moving object and the like as an image.

Since such intermediate image control section 1c displays the intermediate entire image, in which the blur image BP is disposed, on the specific track, a viewer perceives a smooth change similar to a case where a plurality of images are interposed or animated images are interposed between the first and second entire images even if there is only one interposed image.

Figure 7:
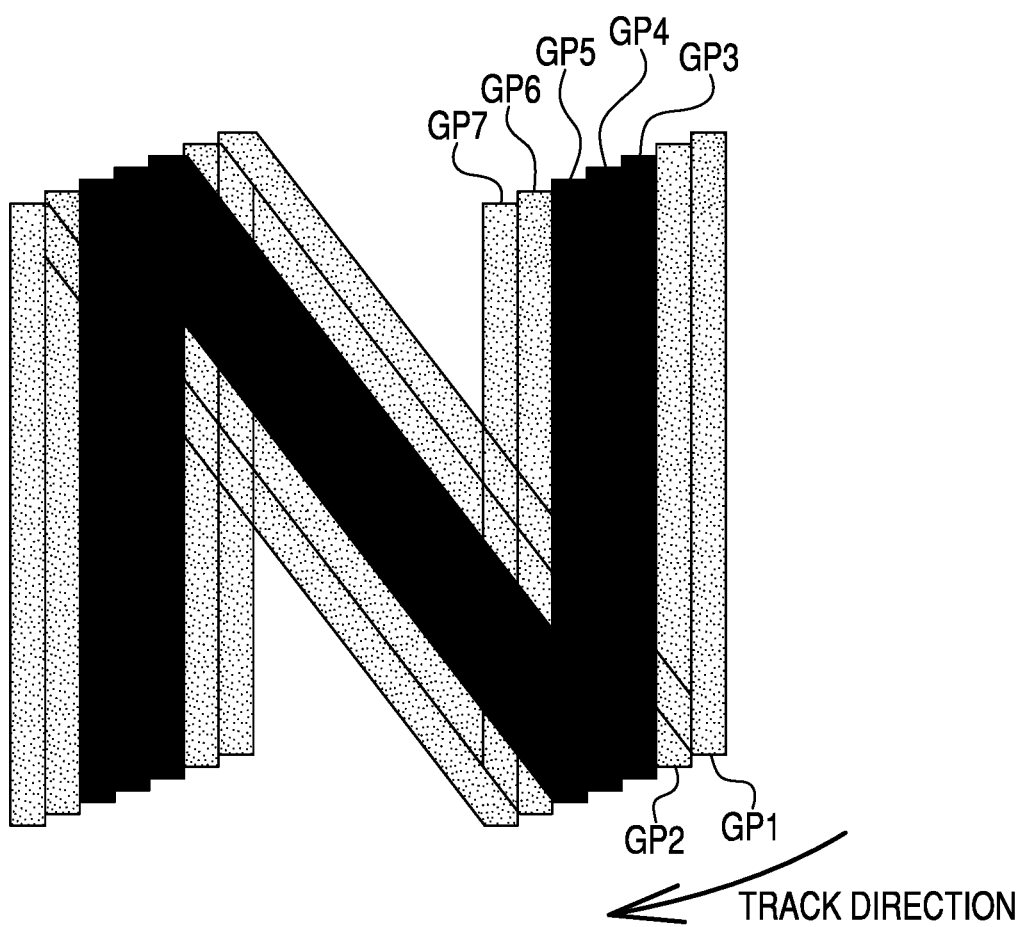
FIG. 7 is an enlarged view illustrating in detail a part of a blur image BP.

FIG. 7 is an enlarged view illustrating in detail a part of the blur image BP. The normal mode display image NP is configured of a character image of "NORMAL". Then, the blur image BP is, for example, illustrated in FIG. 7 as a character "N".

First, as described above, the blur image BP is extended in the track direction. In addition, such blur image BP is a gradation image of which gradation is changed in an extended direction as indicated by the character of "N" in FIG. 7.

In detail, in the example illustrated in FIG. 7, the character "N" is formed by causing images GP1 to GP7 of seven "N" to overlap as a result of extending in the track direction. Among them, the image GP4 positioned in the middle of the seven images GP1 to GP7 becomes an image darker than the other images. Next, dark images are formed in order of the images GP3 and GP5, the images GP2 and GP6, and the images GP1 and GP7.

Moreover, in FIG. 7, only the character "N" in the normal mode display image NP configured of the character image of "NORMAL" is exemplified, but the same is applied to the other character "ORMAL". Furthermore, in the example illustrated in FIG. 7, the seven images GP1 to GP7 are described as an example, but it is not particularly limited to the seven images. In addition, the darkest image is not limited to the image GP4 positioned in the middle thereof and the image GP1 or the image GP7 positioned at the end thereof may be the darkest image.

Figure 8:
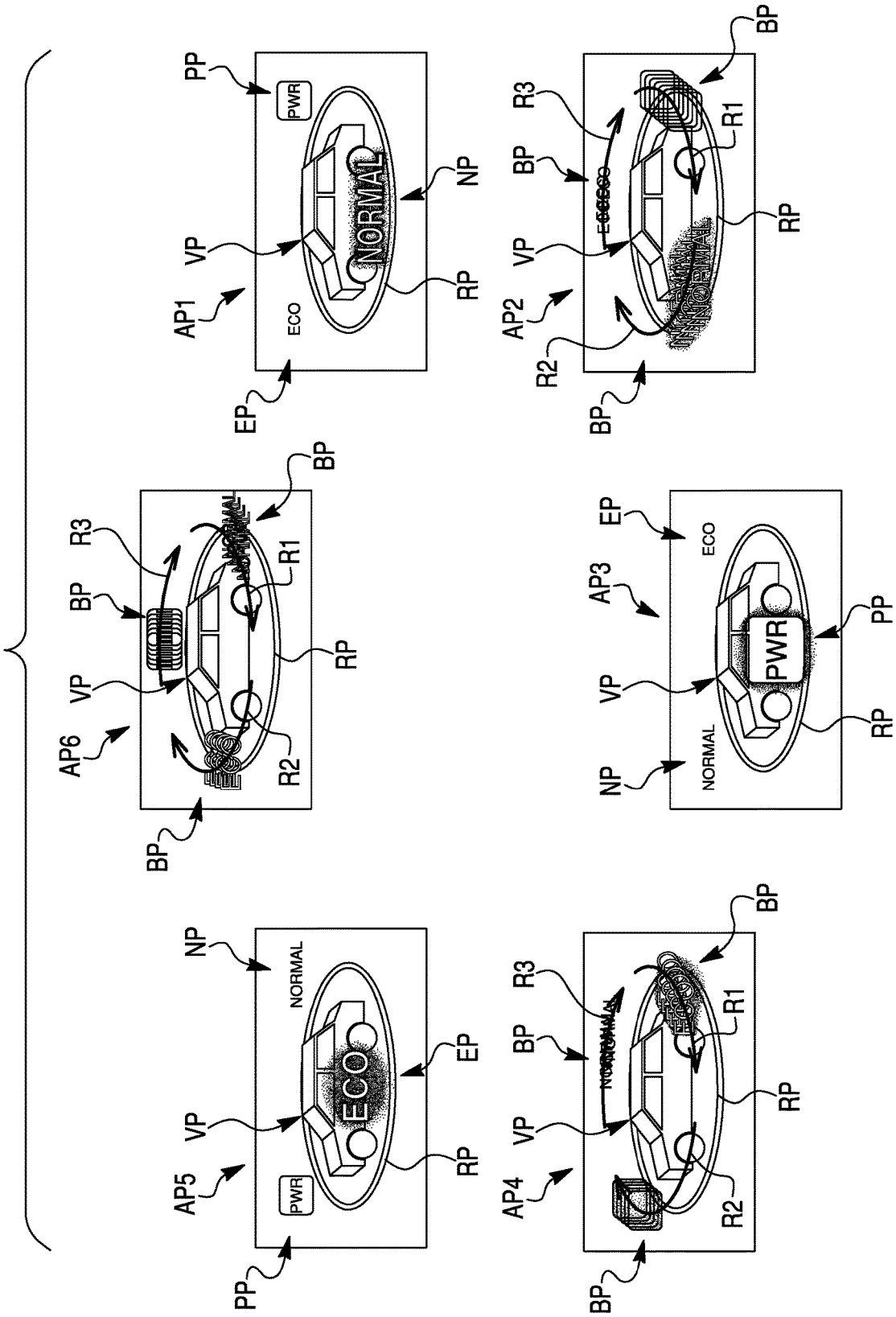
FIG. 8 is a front view illustrating a transition state of a display image by the display device for a vehicle according to the embodiment.

FIG. 8 is a front view illustrating the transition state of the display image by the display device for a vehicle according to the embodiment. In more detail, the display device for a vehicle of the embodiment can display six entire images AP1 to AP6 illustrated in FIG. 8. Moreover, the entire image AP5 illustrated in FIG. 8 is the same as the image illustrated in FIG. 5A, the entire image AP6 is the same as the image illustrated in FIG. 6, and the entire image AP1 is the same as the image illustrated in FIG. 5B.

In the embodiment, the traveling modes are changed whenever the switch 9 is operated. Thus, if the switch 9 is operated from the state where the entire image AP5 is displayed, the entire image AP1 is displayed via the entire image AP6. Similarly, if the switch 9 is operated from the state where the entire image AP1 is displayed, the entire image AP3 is displayed via the entire image AP2, and if the switch 9 is operated from the state where the entire image AP3 is displayed, the entire image AP5 is displayed via the entire image AP4. Thus, in a case where the entire image AP5 is the first entire image, the entire image AP1 corresponds to the second entire image, in a case where the entire image AP1 is the first entire image, the entire image AP3 corresponds to the second entire image, and in a case where the entire image AP3 is the first entire image, the entire image AP5 corresponds to the second entire image.

Here, similar to the entire image AP6 described above, the entire images AP2 and AP4 correspond to the intermediate entire image and in the entire image AP2, the blur image BP, in which the power mode display image PP is extended in the track direction, is positioned and displayed on the track R1. In the entire image AP4, the blur image BP, in which the eco mode display image EP is extended in the track direction, is positioned and displayed on the track R1.

Furthermore, also as illustrated in each of the intermediate entire images AP2, AP4, and AP6, the blur image BP is displayed not only on the track from the upper right corner of the screen to the center of the screen, but also on a track R2 from the center of the screen to the upper left corner of the screen and a track R3 from the upper left corner of the screen to the upper right corner of the screen. Thus, in the embodiment, changes of three traveling modes are smoothly expressed by displaying only one intermediate entire image having three blur images BP.

Here, as illustrated in FIGS. 5 and 8, the first image control section 1a and the second image control section 1b cause a rotation track image (still image) RP and a vehicle image (still image) VP of which positions are not changed in the first entire image and the second entire image.

The rotation track image RP is an image extending in the track direction and is a ring-shaped line image covering surroundings of the vehicle image VP in the example illustrated in FIGS. 5 and 8. The first image control section 1a and the second image control section 1b intuitively transmit the track direction to the vehicle crew by displaying such rotation track image RP.

Furthermore, the first image control section 1a and the second image control section 1b display the vehicle image VP in a center of rotation in a rotational direction that is the track direction. As described above, the track direction is intuitively transmitted during the change from the first entire image to the second entire image by displaying the still image in the center position of which the position is not changed during rotation.

In addition, as indicated by each of the intermediate entire images AP2, AP4, and AP6 in FIGS. 6 and 8, the intermediate image control section 1c displays the blur image BP to be overlapped and displayed on the rotation track image RP and the vehicle image VP that are the still images. Thus, the blur image BP that is extended and the rotation track image RP, and the vehicle image VP that are not extended are overlapped and displayed in the intermediate entire image. Then, the change between the images, in which the after-image is further emphasized, is more smoothly expressed by the overlap.

Figure 9:
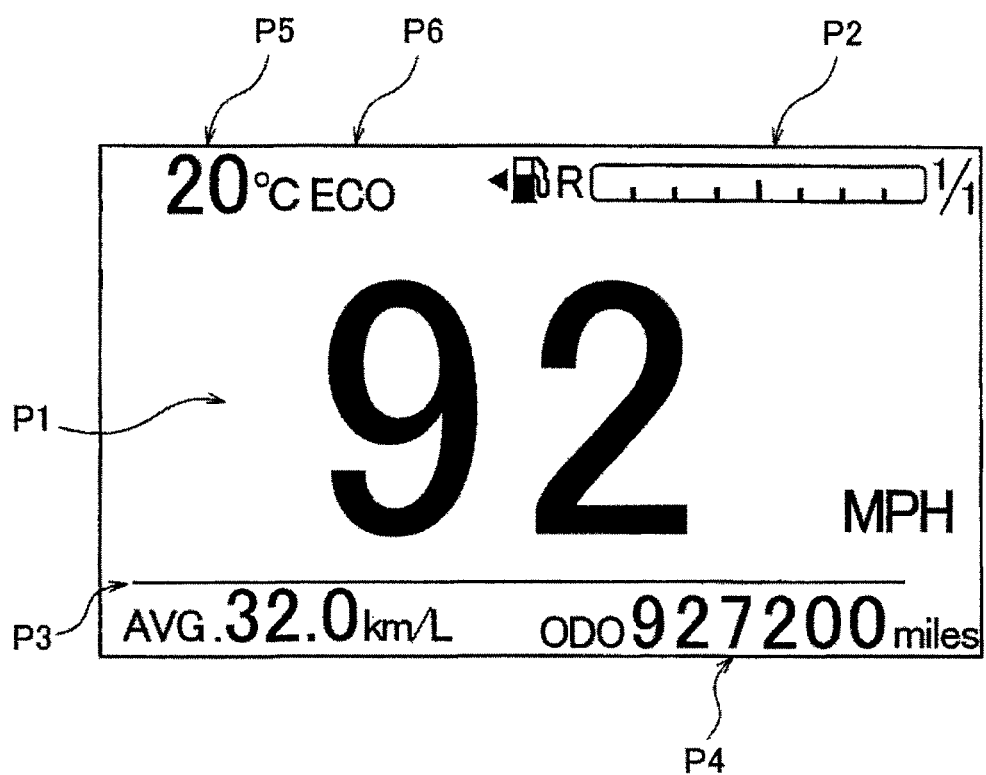
FIG. 9 is a view illustrating an image displayed together with images of the traveling mode.

FIG. 9 is a view illustrating an image displayed together with the images AP1 to AP6 of the traveling mode. As described above, in the embodiment, the display device for a vehicle includes the two displays 8a and 8b. Thus, the image of the traveling mode illustrated in FIG. 8 is displayed on one display 8 and the image illustrated in FIG. 9 can be displayed on the other display 8.

As illustrated in FIG. 9, the display device for a vehicle displays a running speed image P1, a fuel gauge image P2, an average fuel consumption image P3, an odometer image P4, and an outside temperature gauge image P5 on the other display 8. Specifically, the display device for a vehicle displays the outside temperature gauge image P5 in an upper right corner of the display 8 and displays the fuel gauge image P2 in an upper right corner thereof. In addition, the display device for a vehicle displays the average fuel consumption image P3 in a lower left corner of the display 8 and displays the odometer image P4 in a lower right corner thereof. Furthermore, the display device for a vehicle displays the running speed image P1 in a center of the screen of the display 8.

In addition, the display device for a vehicle displays a traveling mode image (image indicating the eco mode in FIG. 9) P6 between the outside temperature gauge image P5 and the fuel gauge image P2. Contents of the traveling mode image P6 correspond to the traveling mode displayed in one display 8. Thus, if the switch 9 is operated and the traveling mode is changed, image control is performed as illustrated in FIGS. 5 to 8 and also for the other display 8, the contents of the traveling mode image P6 are changed in conjunction with one display 8.

Figure 10:
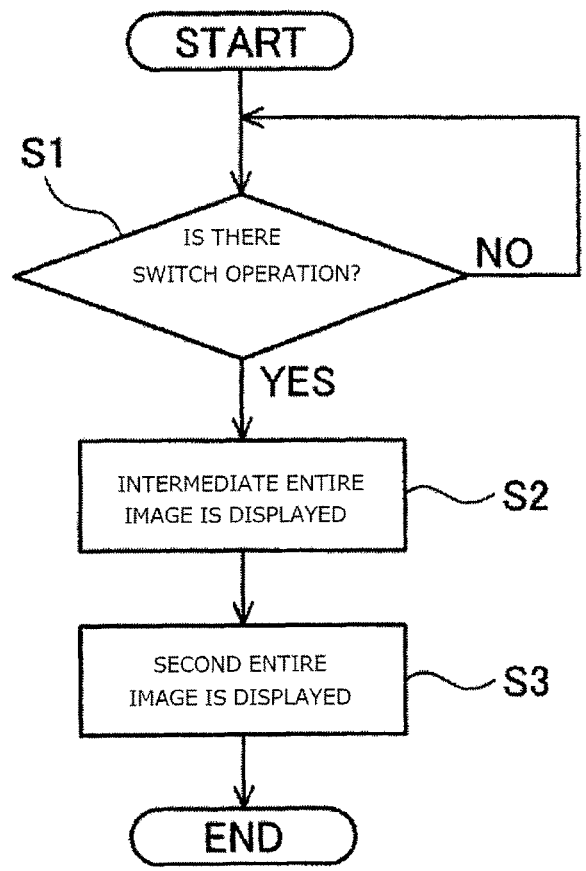
FIG. 10 is a flowchart illustrating a process of the display device for a vehicle according to the first embodiment.

FIG. 10 is a flowchart illustrating a process of the display device for a vehicle according to the first embodiment. First, the first image control section 1a of the CPU 1 displays the first entire image on the display 8. Then, as illustrated in FIG. 10, the CPU 1 determines whether an operation is performed with respect to the switch 9 (S1).

If it is determined that the operation is not performed (S1: NO), the process is repeated until the operation is performed. On the other hand, if it is determined that the operation is performed (S1: YES), the intermediate image control section 1c displays the intermediate entire image in accordance with the first entire image in the current display that is stored in advance (S2). The intermediate entire image indicates the intermediate stage of the change between the first entire image and the second entire image, and, as described above, the blur image BP is disposed on the specific track.

Thereafter, the second image control section 1b displays the second entire image that is the final display state (S3). Then, the process illustrated in FIG. 10 is completed. Moreover, the process illustrated in FIG. 10 is repeatedly executed until the power supply of the display device for a vehicle is turned off. In addition, it is needless the say that the second entire image displayed in step S3 is the first entire image in the next process illustrated in FIG. 10.

As described above, in the display device for a vehicle according to the first embodiment, only one intermediate entire image indicating the intermediate stage of the change between the first entire image and the second entire image is displayed. Thus, in order to smoothly express the change between the first entire image and the second entire image, only one intermediate entire image may be stored and it is possible to reduce a storage capacity. In addition, the intermediate entire image has the blur image BP in which the mode images NP, PP, and EP are extended in the track R1 direction on the track R1 when the mode images NP, PP, and EP move to the center of the screen. As described above, similar to a case where a plurality of images are interposed or the animated images are interposed, the viewer perceives the smooth change by displaying the blur image BP in which the mode images NP, PP, and EP are extended on the track R1, for example, even if there is one image. Thus, the change between the images is smoothly expressed and it is possible to reduce the storage capacity that is used for the smooth expression.

In addition, since the blur image BP is the gradation image of which the gradation is changed in the extended direction, afterimage feeling is further increased by the change of the gradation and thereby it is possible to further smoothly express the change between the images.

In addition, in order to display the second entire image changed from the first entire image by inputting instruction contents from the vehicle crew, the image is changed by the switch operation and a sound input of the vehicle crew, and the like, and then it is possible to smoothly express the change of the images in accordance with the intention of the vehicle crew.

In addition, the plurality of the mode images NP, PP, and EP are displayed within each entire image and the second entire image, in which the arrangement of the plurality of the mode images NP, PP, and EP are changed from the first entire image, and is displayed in accordance with the plurality of states of the vehicle. Thus, in a case where the plurality of the states of the vehicle are displayed and the current state of the vehicle is displayed from the arrangement, it is possible to smoothly express the change between the images.

In addition, the rotation track image RP and the vehicle image VP of which the positions are not changed in the first entire image and the second entire image are displayed, and the blur images BP are overlapped and displayed on the rotation track image RP and the vehicle image VP in the intermediate entire image. Thus, in the intermediate entire image, the blur image BP that is extended and the rotation track image RP and the vehicle image VP that are not extended are overlapped and displayed, and then the afterimage feeling is further emphasized by the overlap and it is possible to further smoothly express the change between the images.

In addition, in order to display the rotation track image RP extending in the track direction as the still image, it is possible to intuitively transmit the track direction to the vehicle crew.

In addition, in a case where the track direction is the rotational direction, in order to display the vehicle image VP in the center of rotation, the vehicle image VP is displayed in the center position that is not changed during the rotation and it is possible to intuitively transmit the track direction during the change from the first entire image to the second entire image.

Next, a second embodiment of the invention will be described. A display device for a vehicle according to the second embodiment is similar to that of the first embodiment, but a part of the contents is different. Hereinafter, different points from the first embodiment will be described.

First, the display device for a vehicle according to the second embodiment is directed to an image change during an automatic gear change when a vehicle is stopped (including a certain speed or less) in a case of manual reduction of an automatic vehicle. That is, in a case of the manual reduction in the automatic vehicle, if a vehicle speed becomes a certain speed or less, the gear becomes automatically a first speed in preparation for subsequent starting of a vehicle. Thus, in the display device for a vehicle according to the second embodiment, an image indicating before an automatic gear change corresponds to a first entire image and an image after the automatic gear change corresponds to a second entire image. Then, the display device for a vehicle displays an intermediate entire image to be interposed between the entire images.

Figure 11A:
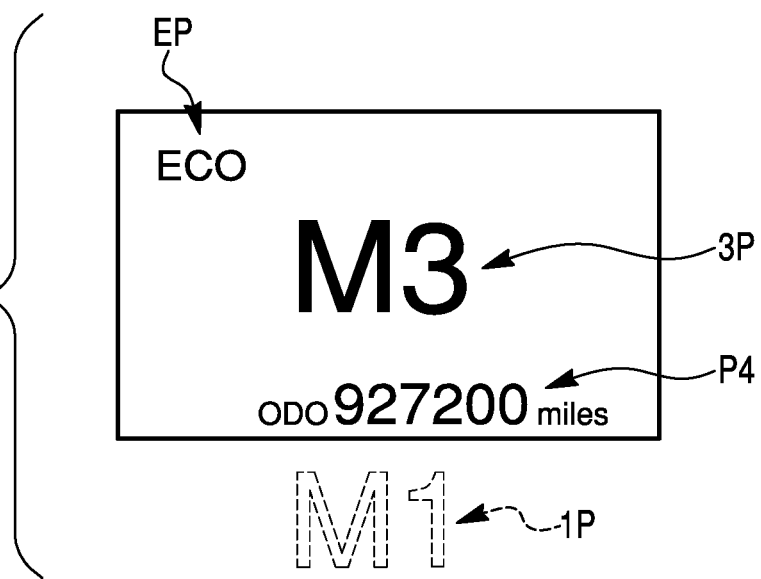
FIGS. 11A to 11C are front views illustrating images of a display device for a vehicle according to a second embodiment.
Figure 11B:
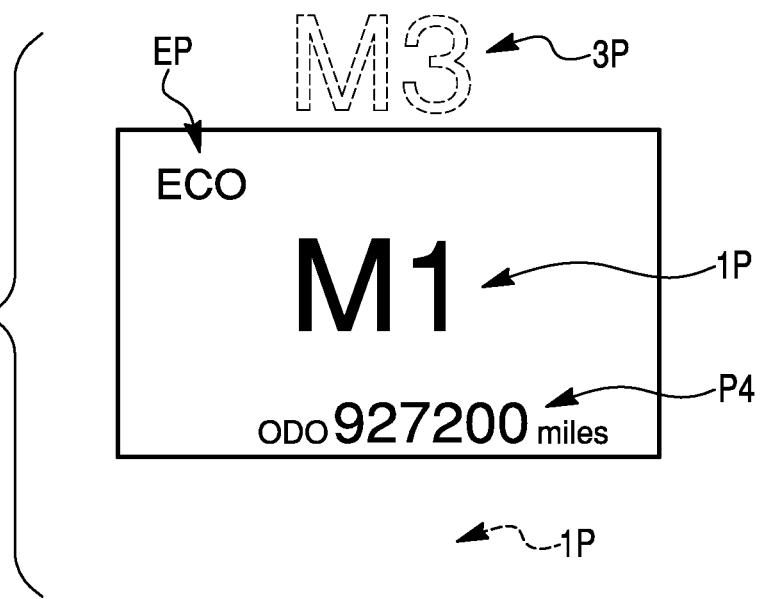
Figure 11C:
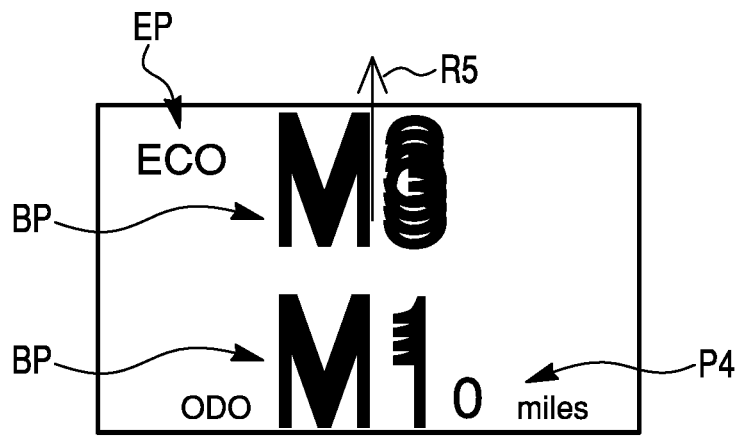

FIGS. 11A to 11C are front views illustrating images of the display device for a vehicle according to the second embodiment, FIG. 11A illustrates the first entire image, FIG. 11B illustrates the second entire image, and FIG. 11C illustrates the intermediate entire image. As illustrated in FIGS. 11A and 11B, first and second image control sections 1a and 1b display an eco mode display image EP indicating that a traveling mode is an eco mode and an odometer image P4 within the first and second entire images.

Furthermore, if the gear is a third speed before the automatic gear change, as illustrated in FIG. 11A, the first image control section 1a displays the first entire image, in which a third speed image 3P is largely disposed in a center of the screen, to illustrate that the current gear is the third speed.

Then, if the vehicle is gradually decelerated and becomes a certain speed or less, the second image control section 1b displays the second entire image illustrated in FIG. 11B.

That is, as illustrated in FIG. 11B, the second image control section 1b displays the second entire image, in which a first speed image (certain mark) 1P is largely disposed in the center of the screen (certain portion), to illustrate that the current gear is the first speed.

Then, the intermediate image control section 1c displays the intermediate entire image illustrated in FIG. 11C to be interposed between the first entire image and the second entire image.

Here, in the first entire image illustrated in FIG. 11A, the first speed image 1P is virtually positioned on a lower side on an outside of the screen and in the second entire image illustrated in FIG. 11B, the third speed image 3P is virtually positioned on an upper side on the outside of the screen. Then, as illustrated in FIG. 11C, in the second embodiment, the blur image BP with respect to the first speed image 1P is displayed on a track R4 until the blur image BP reaches the center of the screen from the lower side on the outside of the screen, and the blur image BP with respect to the third speed image 3P is displayed on a track R5 until the blur image BP reaches the upper side on the outside of the screen from the center of the screen. Thus, the first speed image 1P is expressed so as to slide in from the lower side of the screen and the third speed image 3P is expressed so as to slide out on the upper side of the screen.

Moreover, similar to the first embodiment, the blur image BP in the second embodiment is extended in the track direction and becomes the gradation image. In addition, as illustrated in FIGS. 11a to 11C, the eco mode display image EP and the odometer image P4 become still images of which positions are not changed in the first entire image and the second entire image, and the intermediate image control section 1c displays the blur image BP of the first speed image 1P to be overlapped and displayed on the odometer image P4. Thus, the afterimage feeling is further emphasized during slide-in.

Thus, according to the display device for a vehicle of the second embodiment, similar to the first embodiment, the change between the images is smoothly expressed and it is possible to reduce the storage capacity that is used for the smooth expression. In addition, the afterimage feeling is further increased by the change of the gradation and it is possible to further smoothly express the change between the images. Furthermore, the blur image BP that is extended and the odometer image (still image) P4 that is not extended are overlapped and displayed, and then the afterimage feeling is further emphasized by the overlap and it is possible to further smoothly express the change between the images.

Next, a third embodiment of the invention will be described. A display device for a vehicle according to the third embodiment is similar to that of the first embodiment, but a part of the contents is different. Hereinafter, different points from the first embodiment will be described.

First, the display device for a vehicle according to the third embodiment is directed to an image change when a warning light is turned on in a display 8. That is, the warning light in the example illustrated in FIG. 2 is not to be displayed on the display 8, but is described to be turned on by the lamp provided on a rear surface of a dial 12. However, the warning light in the third embodiment is displayed on the display 8. In the display device for a vehicle according to the third embodiment, an image indicated before turning on of the warning light corresponds to a first entire image and an image after turning on of the warning light corresponds to a second entire image. Then, the display device for a vehicle causes an intermediate entire image to be interposed between the entire images.

Figure 12A:
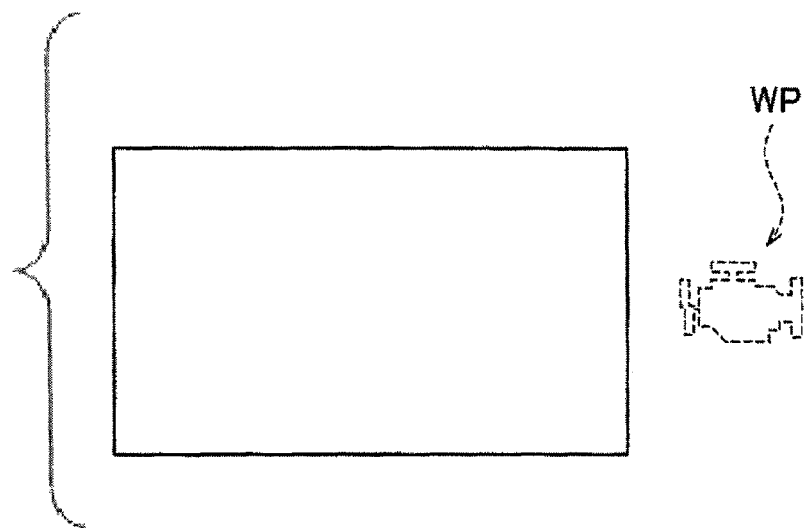
FIGS. 12A to 12C are front views illustrating images of a display device for a vehicle according to a third embodiment.
Figure 12B:
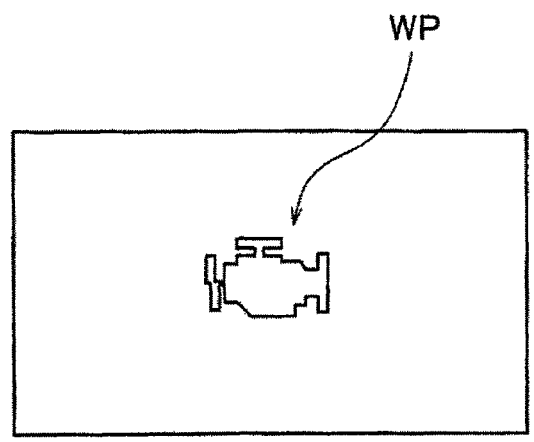
Figure 12C:
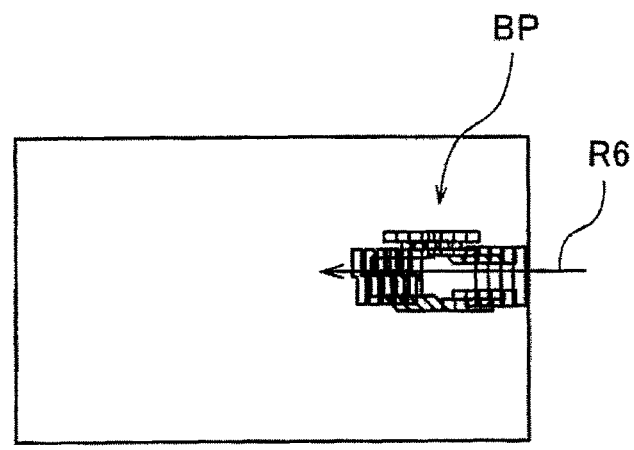

FIGS. 12A to 12C are front views illustrating images of the display device for a vehicle according to the third embodiment, FIG. 12A illustrates the first entire image, FIG. 12B illustrates the second entire image, and FIG. 12C illustrates the intermediate entire image.

A first image control section 1a displays the first entire image as illustrated in FIG. 12A) before turning on of the warning light, that is, before generation of warning. Here, since warning is not generated yet, a dark image, in which there is no content to be displayed, is displayed as the first entire image.

Thereafter, for example, if abnormality occurs in an engine, as illustrated in FIG. 12B, a second image control section 1b displays the second entire image which has a warning light image WP (certain mark) indicating engine abnormality in a center of the screen (certain portion).

Then, an intermediate image control section 1c causes the intermediate entire image as illustrated in FIG. 12C to be interposed between the first entire image and the second entire image.

Here, in the first entire image illustrated in FIG. 12A, the warning light image WP is, for example, virtually positioned on a right side (the driver seat side illustrated in FIG. 2) of the screen. Thus, as illustrated in FIG. 12C, in the third embodiment, a blur image BP with respect to the warning light image WP is displayed on a track R6 until the warning light image WP reaches the center of the screen from the right side of the screen. Therefore, the warning light image WP is expressed so as to slide in from the right side of the screen.

Moreover, in the third embodiment, similar to the first embodiment, the blur image BP is extended in the track direction and becomes the gradation image. In addition, in the example of FIG. 12B, an example shows only one warning light image WP is displayed in the center of the screen, but is not limited to the example, and, as illustrated in FIG. 9, other images may be displayed in addition to the warning light image WP. In this case, if the still image of which the position is not changed is included in the other images, the intermediate image control section 1c may cause the blur image BP to be overlapped and displayed on the still image.

In addition, the warning light image WP is not limited to those that warn of engine abnormality and may be other images of warning lights such as oil pressure abnormality, battery abnormality, and door opening. Furthermore, a plurality of images of warning lights may be displayed within the screen.

As described above, in the display device for a vehicle according to the third embodiment, similar to the first embodiment, the change between the images is smoothly expressed and it is possible to reduce the storage capacity that is used for the smooth expression. In addition, the afterimage feeling is further increased by the change of the gradation and it is possible to further smoothly express the change between the images. Furthermore, the blur image BP that is extended and the odometer image (still image) P4 that is not extended are overlapped and displayed, and then the afterimage feeling is further emphasized by the overlap and it is possible to further smoothly express the change between the images. As a result, the afterimage feeling is emphasized and then the driver can easily recognize that a warning is emitted.

Next, a fourth embodiment of the invention will be described. A display device for a vehicle according to the fourth embodiment is similar to that of the first embodiment, but a part of the contents is different. Hereinafter, different points from the first embodiment will be described.

Figure 13:
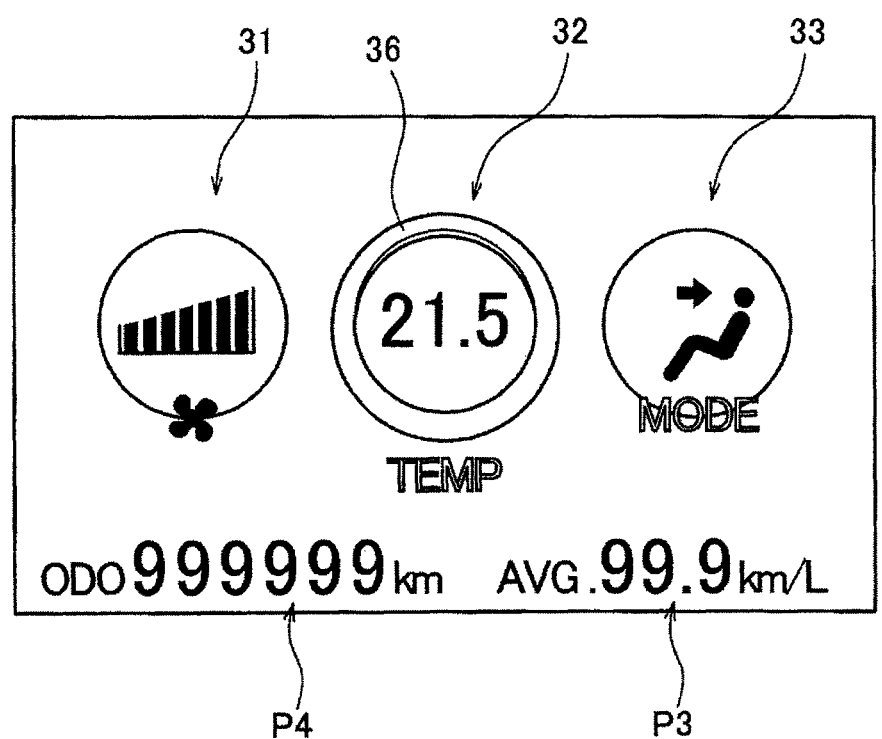
FIG. 13 is a view illustrating an example of heater control panel images.

First, the display device for a vehicle according to the fourth embodiment is directed to a change in heater control panel images displayed in a display 8. Here, an example of the heater control panel images will be described. FIG. 13 is a view illustrating an example of the heater control panel images. The heater control panel images include images 31 to 33 of an air volume item, a temperature item, and an airflow direction item regarding setting of an air volume, a temperature, and an airflow direction within the vehicle, and, for example, the image 31 of the air volume item, the image 32 of the temperature item, and the image 33 of the airflow direction item are displayed side by side in this order, for example, from the left side (passenger seat side). Moreover, the odometer image P4 and the average fuel consumption image P3 are also displayed in a lower portion of the heater control panel images.

Furthermore, a frame image 36 indicating a selection item that is a current selection is also displayed within the heater control panel image. In the example illustrated in FIG. 13, the frame image 36 is positioned on the image 32 of the temperature item. Thus, the vehicle is in a state where a change operation is performed regarding a setting temperature. That is, in this state, if the change operation is performed with respect to a certain operation section, the setting temperature is higher or lower than the present temperature.

The display device for a vehicle according to the fourth embodiment is directed to the positional change of such frame image 36, an image indicating before the movement of the frame image 36 corresponds to the first entire image, and an image indicating after the movement of the frame image 36 corresponds to the second entire image. Then, the display device for a vehicle causes an intermediate entire image to be interposed between the entire images. Moreover, in the following description, the heater control panel images illustrated in FIG. 13 are the first entire image.

Figure 14A:
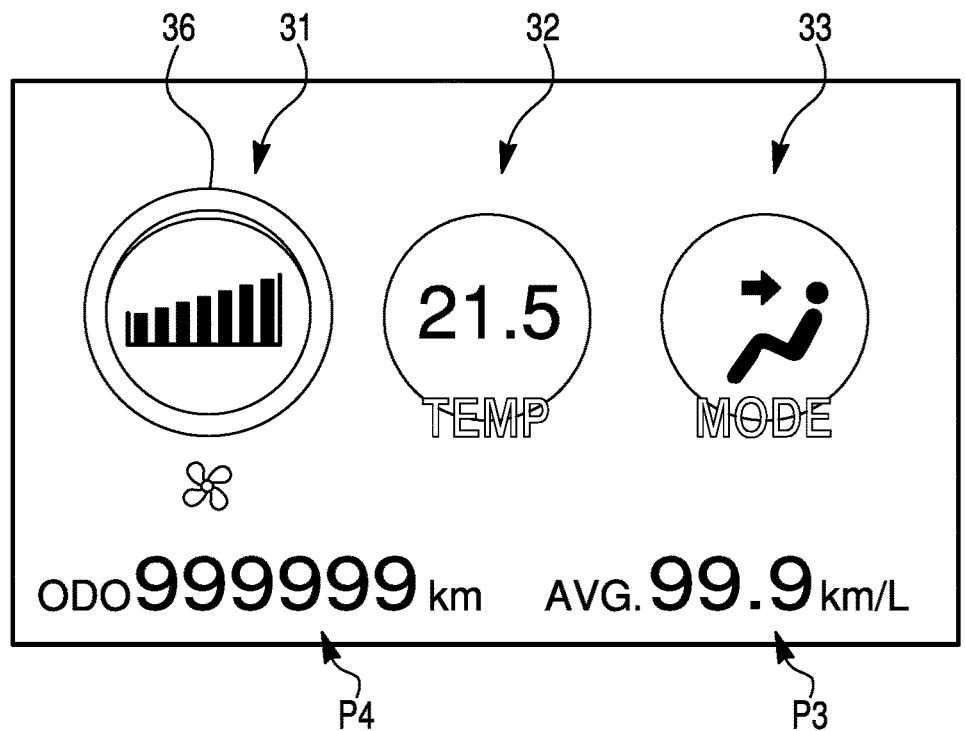
FIGS. 14A and 14B are front views illustrating images of a display device for a vehicle according to a fourth embodiment.
Figure 14B:
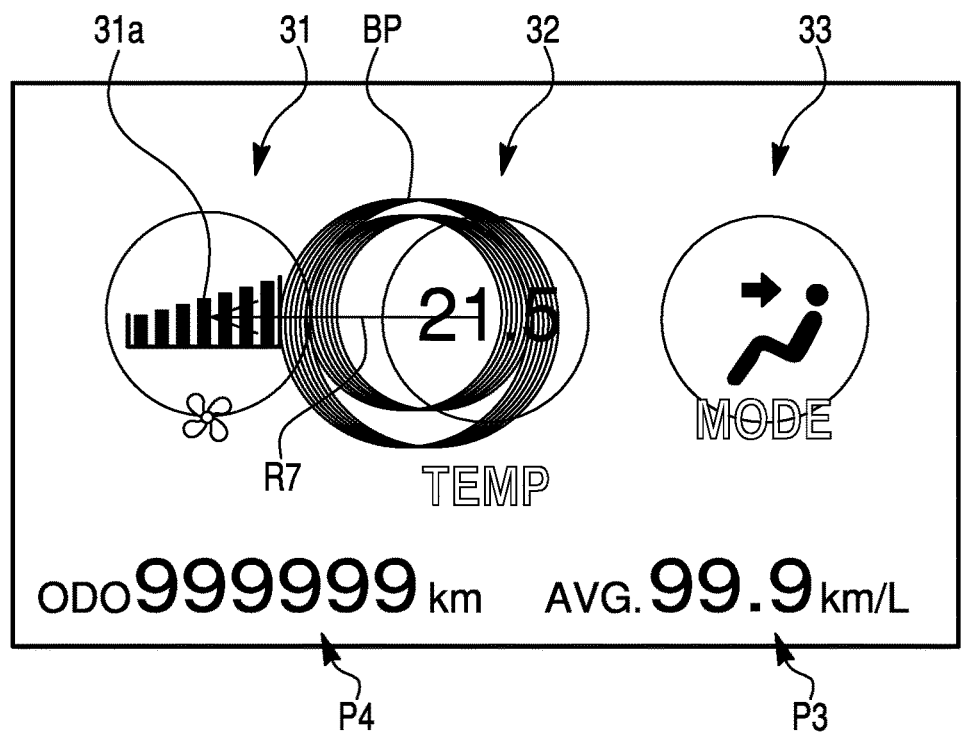

FIGS. 14A and 14B are front views illustrating the images of the display device for a vehicle according to the fourth embodiment, FIG. 14A illustrates the second entire image, and FIG. 14B illustrates the intermediate entire image.

First, as illustrated in FIG. 13, the first image control section 1a displays the heater control panel image before the movement of the frame image 36 as the first entire image. Thereafter, for example, the vehicle crew operates the switch 9 and the like to move the frame image 36 to the left side. Thus, as illustrated in FIG. 14A, the second image control section 1b displays the second entire image, in which the frame image (certain mark) 36 is positioned on the image 31 (certain portion) of the air volume item.

Then, the intermediate image control section 1c causes the intermediate entire image illustrated in FIG. 14B to be interposed between the first entire image and the second entire image.

That is, the intermediate image control section 1c displays the intermediate entire image, in which the blur image BP of which the frame image 36 is extended in the track direction is disposed, on a track R7 from the image of the temperature item to the image 31 of the air volume item.

Moreover, in the fourth embodiment, similar to the first embodiment, the blur image BP is the gradation image. In addition, in the example illustrated in FIG. 14B, the blur image BP is displayed in an overlapping manner on the image 31 of the air volume item in which the blur image BP is stopped and the image 32 of the temperature item.

As described above, in the display device for a vehicle according to the fourth embodiment, similar to the first embodiment, the change between the images is smoothly expressed and it is possible to reduce the storage capacity that is used for the smooth expression. In addition, the afterimage feeling is further increased by the change of the gradation and it is possible to further smoothly express the change between the images. Furthermore, it is possible to smoothly express the change of the images in accordance with the intention of the vehicle crew. In addition, the blur image BP that is extended and the odometer image (still image) P4 that is not extended are displayed in the overlapping manner, and then the afterimage feeling is further emphasized by the overlap and it is possible to further smoothly express the change between the images. As a result, it is possible to strengthen the operational feeling (click feeling) to the driver.

Next, a fifth embodiment of the invention will be described. A display device for a vehicle according to the fifth embodiment is similar to that of the first embodiment, but a part of the contents is different. Hereinafter, different points from the first embodiment will be described.

First, similar to the first embodiment, the display device for a vehicle according to the fifth embodiment is directed to a change of a traveling mode. Thus, in the display device for a vehicle according to the fifth embodiment, an image before the change of the traveling mode corresponds to a first entire image, and an image after the change of the traveling mode corresponds to a second entire image. The display device for a vehicle causes an intermediate entire image to be interposed between the entire images.

Figure 15A:
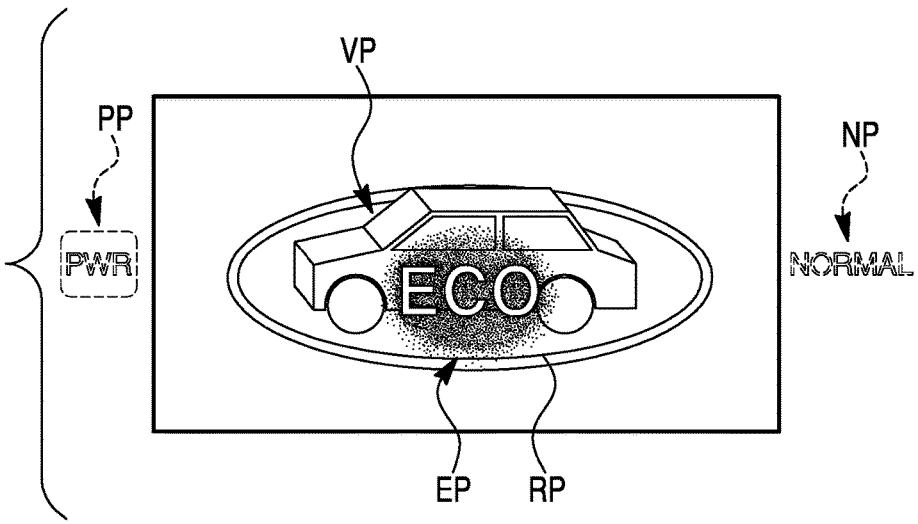
FIGS. 15A to 15C are front views illustrating images of a display device for a vehicle according to a fifth embodiment.
Figure 15B:
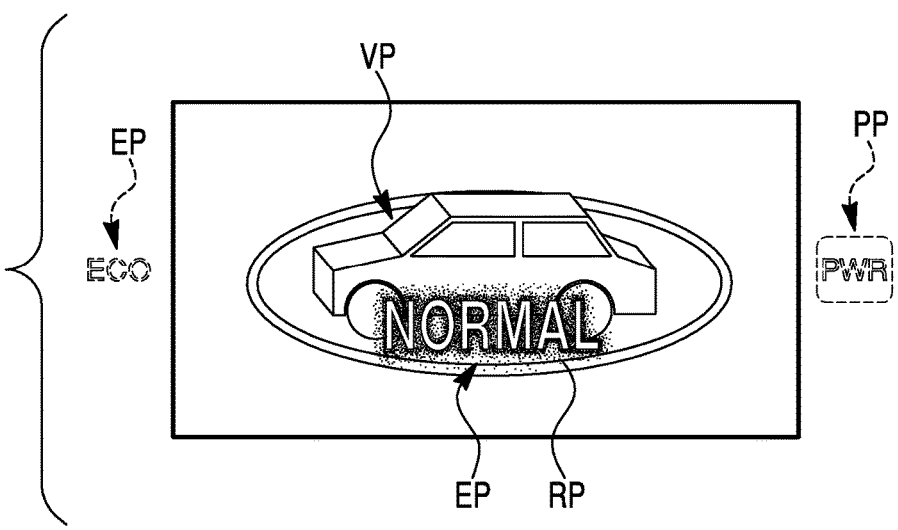
Figure 15C:
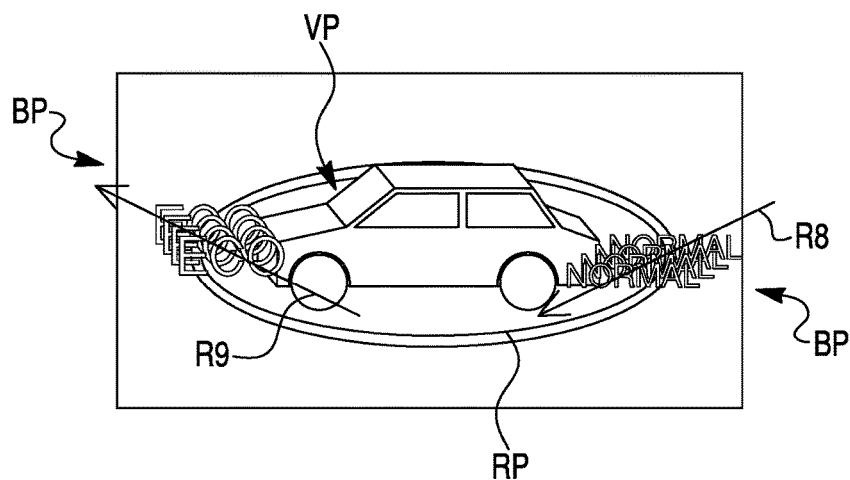

FIGS. 15A to 15C are front views illustrating images of the display device for a vehicle according to the fifth embodiment, FIG. 15A illustrates the first entire image, FIG. 15B illustrates the second entire image, and FIG. 15C illustrates the intermediate entire image. Moreover, in each image illustrated in FIGS. 15A to 15C, the same reference numerals are given to the same elements as those of the first embodiment.

First, if a current traveling mode is the eco mode, as illustrated in FIG. 15A, the first image control section 1a displays an eco mode display image (certain mark) EP within the first entire image. In this case, the first image control section 1a displays the first entire image, in which the eco mode display image EP is largely disposed in the center of the screen.

Moreover, in the first entire image, a normal mode display image NP and a power mode display image PP indicating other traveling modes are not displayed. In the first entire image, the images NP and PP of the other traveling modes are virtually positioned on an outside of the screen, the normal mode display image NP is virtually positioned on the right side on the outside of the screen, and the power mode display image PP is virtually positioned on the left side on the outside of the screen.

Then, if a switch 9 is pressed once by the vehicle crew from such a display state, the traveling mode is changed from the eco mode to the normal mode and the second image control section 1b displays the second entire image illustrated in FIG. 15B.

That is, as illustrated in FIG. 15B, the second image control section 1b displays the second entire image, in which the normal mode display image (certain mark) NP is largely disposed in the center of the screen (certain portion) of the display 8, so that the current traveling mode is indicated as the normal mode.

Moreover, also in the second entire image, the power mode display image PP and the eco mode display image EP that are other traveling modes are not disposed, the power mode display image PP is virtually positioned on the right side on the outside of the screen and the eco mode display image EP is virtually positioned on the left side on the outside of the screen.

Then, the intermediate image control section 1c causes the intermediate entire image illustrated in FIG. 15C to be interposed between the first entire image and the second entire image.

In the intermediate entire image, the blur image BP, in which the normal mode display image NP is extended in the track direction, is disposed on a track R8 from the right side on the outside of the screen to the center of the screen. Furthermore, in the intermediate entire image, the blur image BP, in which the eco mode display image EP is extended in the track direction, is disposed on a track R9 from the center of the screen to the left side on the outside of the screen.

Moreover, as illustrated in FIGS. 15A and 15B, the first and second image control sections 1a and 1b display a rotation track image (still image) RP and a vehicle image (still image) VP of which positions are not changed in the first entire image and the second entire image Furthermore, as illustrated in FIG. 15C, the intermediate image control section 1c displays the blur image BP on the rotation track image RP and the vehicle image VP in the overlapping manner. In addition, in the fifth embodiment, similar to the first embodiment, the blur image BP is the gradation image.

As described above, in the display device for a vehicle according to the fifth embodiment, similar to the first embodiment, the change between the images is smoothly expressed and it is possible to reduce the storage capacity that is used for the smooth expression. In addition, the afterimage feeling is further increased by the change of the gradation and it is possible to further smoothly express the change between the images. Furthermore, it is possible to smoothly express the change of the images in accordance with the intention of the vehicle crew. In addition, the blur image BP that is extended and the odometer image (still image) P4 that is not extended are displayed in the overlapping manner, and then the afterimage feeling is further emphasized by the overlap and it is possible to further smoothly express the change between the images.

Next, a sixth embodiment of the invention will be described. A display device for a vehicle according to the sixth embodiment is similar to that of the first embodiment, but a part of the contents is different. Hereinafter, different points from the first embodiment will be described.

First, the display device for a vehicle according to the sixth embodiment is directed to a change of an opening image when power supply of the vehicle is turned on. Thus, the opening image in the sixth embodiment is configured of two images (first half image and second half image) and an intermediate entire image interposed between the two images. Thus, the first half image of the opening image corresponds to a first entire image, and the second half image corresponds to a second entire image.

Figure 16A:
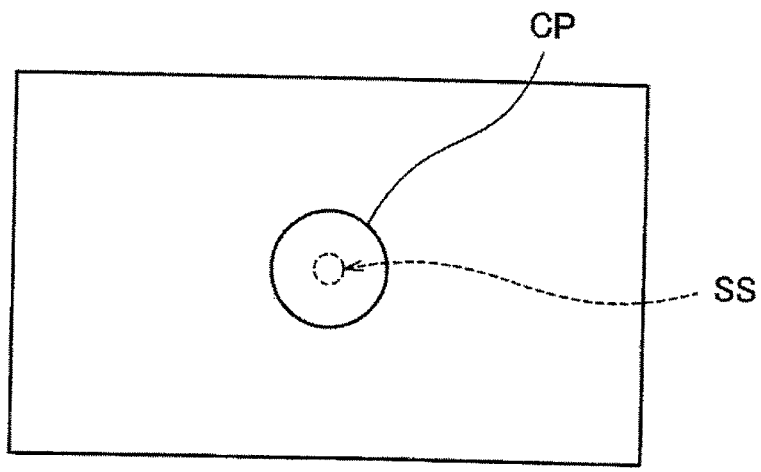
FIGS. 16A to 16C are front views illustrating images of a display device for a vehicle according to a sixth embodiment.
Figure 16B:
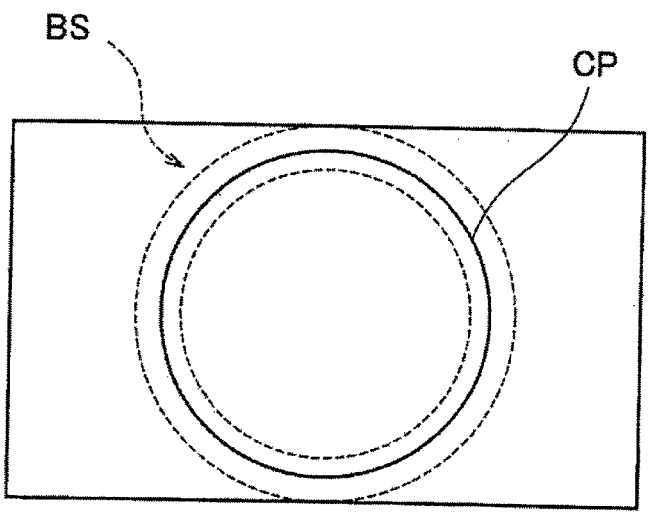
Figure 16C:
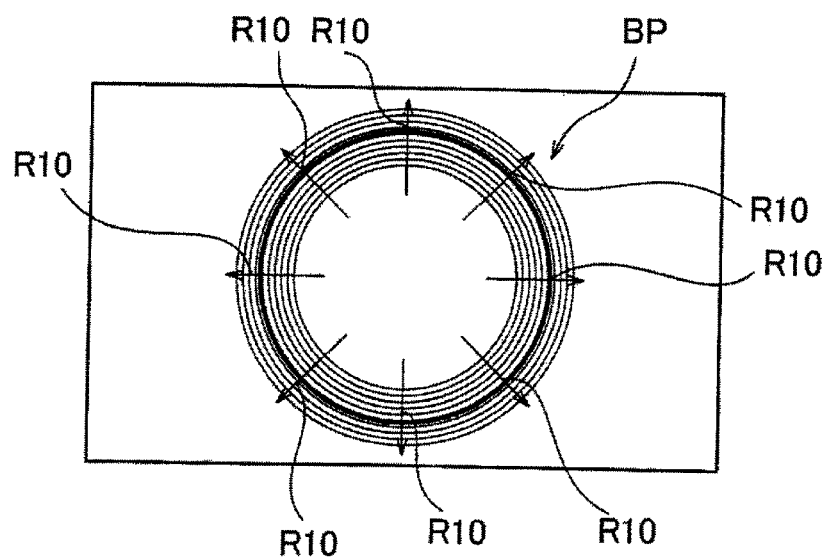

FIGS. 16A to 16C are front views illustrating images of the display device for a vehicle according to the sixth embodiment, FIG. 16A illustrates the first entire image, FIG. 16B illustrates the second entire image, and FIG. 16C illustrates the intermediate entire image.

First, as illustrated in FIG. 16A, the first image control section 1a displays the first entire image, in which a circular image (certain mark) CP is disposed in the center of the screen. Moreover, in the example illustrated in FIG. 16A, the circular image CP is illustrated, but an image of characters or the like indicating a logo mark and a model name of a car manufacturer may be provided instead of the circular image CP.

Then, the second image control section 1b displays the second entire image illustrated in FIG. 16B. That is, as illustrated in FIG. 16B, the second image control section 1b displays the second entire image of which the circular image CP is enlarged more than that of the first entire image. The circular image CP in the second entire image is displayed in an enlarged position (certain portion) BS in which an upper portion of the circle is positioned in the vicinity of an upper end of a screen and an lower portion of the circle is positioned in the vicinity of a lower end of the screen in a rectangular screen. Here, even though not illustrated, the circular image CP illustrated in FIG. 16B corresponds to a decoration (ring) image surrounding a periphery of guidelines and scales (dial) displayed in a center of the circular image CP. After enlargement of the circular image CP, the guidelines, the scales, and the like are sequentially displayed. Moreover, the center position of the circular image CP in the second entire image coincides with the center position of the circular image CP in the first entire image.

Then, the intermediate image control section 1c causes the intermediate entire image illustrated in FIG. 16C to be interposed between the first entire image and the second entire image.

That is, the intermediate image control section 1c displays the intermediate entire image, in which the blur image BP of which the circular image CP is extended in the track direction is disposed, on a track R10 from the center of the screen to the enlarged position BS.

Moreover, in the example illustrated in FIG. 16C, the intermediate image control section 1c displays the blur image BP, in which the circular image CP is extended to the enlarged position BS in the track direction, but is not limited to the example and may display the blur image BP, in which the circular image CP is extended to a reduced position SS (see FIG. 16A) in the transfer direction. In addition, in the sixth embodiment, similar to the first embodiment, the blur image BP is the gradation image and may be displayed on the still image in the overlapping manner.

As described above, in the display device for a vehicle according to the sixth embodiment, similar to the first embodiment, the change between the images is smoothly expressed and it is possible to reduce the storage capacity that is used for the smooth expression. In addition, the afterimage feeling is further increased by the change of the gradation and it is possible to further smoothly express the change between the images. Furthermore, the blur image BP that is extended and the odometer image (still image) P4 that is not extended are displayed in the overlapping manner, and then the afterimage feeling is further emphasized by the overlap and it is possible to further smoothly express the change between the images.

The invention is described based on the embodiments, but the invention is not limited to the above-described embodiments. The invention may be modified without departing from the scope of the invention and the technique of each embodiment and may be combined in a possible range.

For example, the display device for a vehicle according to the embodiments has the display 8 in a part of the instrument 10 for a vehicle, but the display 8 is not limited to a case of providing as a part of the instrument 10 for a vehicle and, for example, may be provided in a portion between the driver seat and the passenger seat, a portion for a rear seat, and the like.

What is claimed is:

1. A display device for a vehicle, which performs information display by a liquid crystal display, the display device comprising:
  a processor; and
  a graphic controller,
  wherein the processor sends a command code to the graphic controller,
  wherein the graphic controller displays a first entire image in a certain entire display region of the liquid crystal display, a second entire image that is changed from the first entire image displayed in the certain entire display region, and a single intermediate entire image indicating an intermediate stage of a change between the first entire image and the second entire image in the certain entire display region according to the command code,
  wherein the second entire image is a final display state in which a certain mark is displayed in a certain portion within the certain display region,
  wherein the intermediate entire image includes an afterimage of the certain mark being extended in a track direction on a track of the certain mark moving to the certain portion,
  wherein the graphic controller displays the single intermediate entire image as an only one interposed image between displaying the first entire image and the second entire image, and wherein the graphic controller displays a rotation track image which is a ring-shaped line image and extended in the track direction.

2. The display device for a vehicle according to claim 1, wherein the afterimage is a gradation image in which gradation is changed in an extended direction.

3. The display device for a vehicle according to claim 1, wherein the processor sends the command code to the graphic controller when instruction contents from a vehicle crew are input thereto, and
wherein the graphic controller displays the second entire image changed from the first entire image.

4. The display device for a vehicle according to claim 1, wherein the graphic controller displays a plurality of state marks corresponding to a plurality of states of the vehicle in each entire image as a plurality of the certain marks, and
wherein the graphic controller displays the second entire image in which an arrangement of the plurality of state marks is changed from the first entire image.

5. The display device for a vehicle according to claim 1, wherein the graphic controller displays a still image whose position is not changed in the first entire image and the second entire image, and
wherein the graphic controller displays the afterimage overlapping the still images in an overlapping manner.

6. The display device for a vehicle according to claim 1, wherein the afterimage is a blur image.

7. The display device for a vehicle according to claim 1, wherein the first entire image indicates a selection of one of a first operation mode of the vehicle and a first item of the vehicle and the second entire image indicates a selection of one of a second operation mode of the vehicle and a second item of the vehicle, the second mode is different from the first mode and the second item is different from the first item, and
wherein the single intermediate entire image indicates a transition from one of the first operation mode and the first item to a respective one of the second operation mode and the second item.

8. The display device for a vehicle according to claim 1, wherein the afterimage is a gradation image in which gradation is changed in the track direction on the track of the certain mark moving to the certain portion and an opposite direction of the track direction.

* * * * *